United States Patent
Friday, Jr. et al.

(10) Patent No.: US 8,484,988 B2
(45) Date of Patent: Jul. 16, 2013

(54) UNINTERRUPTABLE POWER SUPPLY FOR WATER PUMP

(75) Inventors: Arthur F. Friday, Jr., Huntersville, NC (US); Thomas C. Pietrowicz, Brewerton, NY (US)

(73) Assignee: Carrier Corporation, Farmington, CT (US)

( * ) Notice: Subject to any disclaimer, the term of this patent is extended or adjusted under 35 U.S.C. 154(b) by 814 days.

(21) Appl. No.: 12/517,443

(22) PCT Filed: Dec. 28, 2006

(86) PCT No.: PCT/US2006/049559
§ 371 (c)(1),
(2), (4) Date: Feb. 24, 2010

(87) PCT Pub. No.: WO2008/082385
PCT Pub. Date: Jul. 10, 2008

(65) Prior Publication Data
US 2010/0162741 A1    Jul. 1, 2010

(51) Int. Cl.
*F25D 17/00*    (2006.01)
*F25D 17/02*    (2006.01)
*F25B 27/00*    (2006.01)

(52) U.S. Cl.
USPC ............................... 62/178; 62/238.7; 62/434

(58) Field of Classification Search
USPC .................. 62/178, 238.7, 513, 125, 113, 98, 62/434, 201; 417/1; 307/64; 700/282
See application file for complete search history.

(56) References Cited

U.S. PATENT DOCUMENTS

| | | | |
|---|---|---|---|
| 4,682,078 A * | 7/1987 | Pascalide | 315/86 |
| 4,766,734 A | 8/1988 | Dudley | |
| 6,298,677 B1 | 10/2001 | Bujak, Jr. | |
| 6,997,006 B2 | 2/2006 | Kameyama et al. | |
| 7,603,874 B2 * | 10/2009 | Fink et al. | 62/434 |

FOREIGN PATENT DOCUMENTS

| | | |
|---|---|---|
| CN | 2552233 | 5/2003 |
| CN | 2652010 | 10/2004 |
| EP | 0306587 B1 | 2/1991 |

OTHER PUBLICATIONS

International Preliminary Report on Patentability mailed Jul. 9, 2009.
Search Report and Written Opinion mailed on Oct. 19, 2007 for PCT/US2006/049559.

* cited by examiner

*Primary Examiner* — Chen Wen Jiang
(74) *Attorney, Agent, or Firm* — Carlson, Gaskey & Olds, PC

(57) ABSTRACT

A heating/cooling system includes a closed circuit refrigeration system including an evaporator. Water circulating through a closed water circuit exchanges heat with refrigerant in the evaporator, cooling the water for a cooling application. The water can also be heated by a boiler, and the heated water is used to heat a space. A water pump flows the water through the water circuit. When a current sensing relay detects a power failure, a boiler control algorithm is initiated to "trick" a motor of the compressor into believing the heating/cooling system is operating in a heating mode. Therefore, a compressor failure alarm is not generated. The water pump is powered by a battery pack during the power failure. Water continues to flow through the water circuit, preventing the water from freezing.

17 Claims, 2 Drawing Sheets

UNINTERRUPTABLE POWER SUPPLY FOR WATER PUMP

BACKGROUND OF THE INVENTION

The present invention relates generally to an uninterruptible power supply that supplies power to a water pump during a power failure to ensure that water continuously flows through a water circuit to prevent freezing of the water.

Vapor compression systems include a compressor, a condenser, an expansion device and an evaporator that form a chiller. Refrigerant flows through the vapor compression system and defines a closed refrigerant circuit. Refrigerant is compressed to a high pressure in the compressor and then flows through the condenser, where the refrigerant rejects heat to a fluid medium. The refrigerant then is expanded to a low pressure in the expansion device and flows through the evaporator. In the evaporator, the refrigerant accepts heat from water, cooling the water and heating the refrigerant. The refrigerant then reenters the compressor, completing the cycle.

The water flows through a closed water circuit and is pumped through the water circuit by a water pump. The water cooled in the evaporator is used to provide a cooling function downstream from the evaporator. After providing the cooling function, the water returns to the evaporator and is again cooled, completing the cycle.

The water in the water circuit can also be heated in a boiler during a heating mode. The heated water is then used to heat a space. The water then returns to the boiler and is again heated, completing the cycle.

If a power failure occurs, both the compressor and the water pump stop operating, and the flow of refrigerant and water, respectively, stops. If the water flow through the water circuit stops, the water can possibly freeze and expand, possibly damaging the equipment and piping in the water circuit.

Additionally, the power failure would generate a compressor failure alarm because the motor of the compressor is not operating. However, this is disadvantageous because the compressor motor has not failed. Therefore, an unnecessary maintenance call would be made.

Hence, there is a need in the art for an uninterruptible power supply that supplies power to a water pump in the event of a power failure to ensure that water continuously flows through a water circuit to prevent freezing of the water and that overcomes the drawbacks and shortcomings of the prior art.

SUMMARY OF THE INVENTION

A heating/cooling system includes a vapor compression system having a compressor, a condenser, an expansion device, and an evaporator to define a chiller. Refrigerant circulates though a closed refrigerant circuit. The refrigerant is compressed to a high pressure in the compressor. The refrigerant then flows through the condenser and rejects heat to a fluid medium. The refrigerant then passes through the expansion device and is expanded to a low pressure. After expansion, the refrigerant flows through the evaporator and rejects heat to water, cooling the water. The refrigerant then reenters the compressor, completing the refrigerant cycle.

A water pump circulates the water through a water circuit. During a cooling mode, the cooled water from the evaporator is used to provide a cooling function downstream from the evaporator. During a heating mode, the refrigeration system is inactivated, and the water is heated in a boiler to heat a space.

The fans, pumps and motors of the refrigeration system are powered by a main power supply, and the water pump of the water circuit is powered by an uninterruptible power supply. If a power failure occurs, a current sensing relay detects the loss of power. The motor of the compressor stops operating as it is not supplied with any power. A main control initiates a boiler control algorithm which "tricks" the motor of the compressor into believing the heating/cooling system is operating in the heating mode. As the motor of the compressor is "tricked,' a compressor failure alarm is not generated to indicate that the motor of the compressor is not operating. When power is lost, a backup power source powers the water pump of the water circuit during the power failure. The water in the water circuit will continue to flow through the water circuit, preventing the water from freezing.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawing that accompany the detailed description can be briefly described as follows.

DETAILED DESCRIPTION OF THE PREFERRED EMBODIMENT

Figure 1:
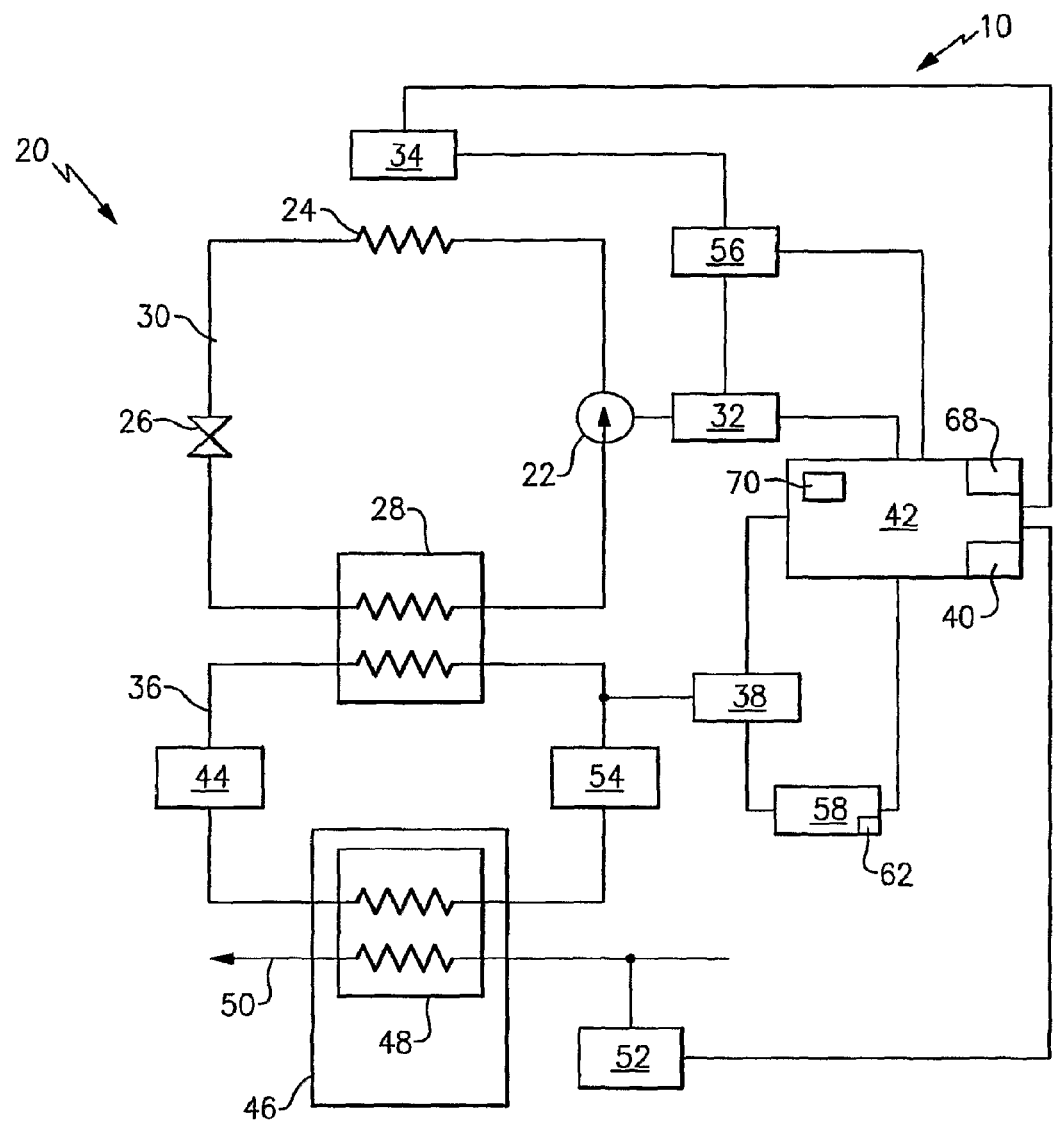
FIG. 1 illustrates a heating/cooling system including a refrigerant circuit powered by a main power supply and a water circuit powered by an uninterruptible power supply.

FIG. 1 illustrates a heating/cooling system 10 including a vapor compression system 20 having a compressor 22, a condenser 24, an expansion device 26, and an evaporator 28 to define a chiller. Refrigerant circulates though the closed circuit vapor compression system 20 and defines a refrigerant circuit 30. The compressor 22 compresses the refrigerant to a high pressure and a high enthalpy. The compressor 22 includes a motor 32. The compressed refrigerant then flows through the condenser 24 and rejects heat to a fluid medium, exiting the condenser 24 at a low enthalpy and a high pressure. The fluid medium is moved through the condenser 24 by a fluid moving device 34. In one example, the fluid medium is air, and the fluid moving device 34 is a fan that blows air over the condenser 24. Alternately, the fluid medium is water, and the fluid moving device 34 is a pump that pumps water through the condenser 24. The cooled refrigerant then passes through the expansion device 26 and is expanded to a low pressure. After expansion, the low pressure refrigerant flows through the evaporator 28 and accepts heat from a fluid medium, such as water, heating the refrigerant and cooling the water. The heated refrigerant exits the evaporator 28 at a high enthalpy and a low pressure. The refrigerant then enters the compressor 22, completing the cycle.

In the evaporator 28, the refrigerant accepts heat with from the water that circulates through a closed water circuit 36. A water pump 38 circulates the water through the water circuit 36.

A main control 42 controls the refrigerant circuit 30 and the water circuit 36. The main control 42 includes a control circuit 68 that controls operation of the components of the refrigerant circuit 30, such as the motor 32 of the compressor 22 and the fluid moving device 34. The control circuit 68 includes a current sensing relay 70 that detects a supply of current to the motor 32. The main control 42 also includes a control circuit 40 that controls operation of the components of the water circuit 26, such as the water pump 38.

When the heating/cooling system 10 is operating in a cooling mode, the water that is cooled in the evaporator 28 exits the evaporator 28 at approximately 45° F. The cooled water is then used downstream to provide a cooling function for a cooling application 44. After providing the cooling function, the water in the water circuit 36 then re-enters the evaporator 28 at approximately 55° F. The water is then again cooled in the evaporator 28, completing the cycle.

When the heating/cooling system 10 is operating in a heating mode, the water in the water circuit 36 enters a boiler 46 at approximately 100° F. The boiler 46 is used to heat the water flowing through the water circuit 36. The water flows through a boiler heat exchanger 48 in the boiler 46 and accepts heat from a heated fluid medium 50. The fluid medium 50 can be water, and a pump 52 is used to pump the fluid medium 50 through the boiler heat exchanger 48. The main control 42 initiates a boiler control algorithm that enables the pump 52 during the heating mode. The boiler control algorithm also indicates that the motor 32 of the compressor 22 should not be operating. The heated water in the water circuit 36 exits the boiler 46 at approximately 120° F. and then provides heat to a space 54. The water then reenters into the boiler 46 and is reheated, completing the cycle.

During the cooling mode, the main control 42 deactivates the pump 52 of the boiler 46, preventing the fluid medium 50 from flowing through the boiler heat exchanger 48 of the boiler 46. The main control 42 activates the motor 32 of the compressor 22 and the fluid moving device 34 to pump the refrigerant through the refrigerant circuit 30. During the heating mode, the main control 42 deactivates the motor 32 of the compressor 22 and the fluid moving device 34, preventing the refrigerant from flowing through the evaporator 28. The main control 42 actuates the pump 52 of the boiler 46 to pump the fluid medium 50 through the boiler heat exchanger 48 to heat the water flowing through the water circuit 36.

A main power supply 56 powers the motor 32 of the compressor 22 and the fluid moving device 34. The main power supply 56 can also power other components of the refrigerant circuit 30, such as fans or pumps. An uninterruptible power supply 58 separate from the main power supply 56 powers the water pump 38 of the water circuit 36.

Figure 2:
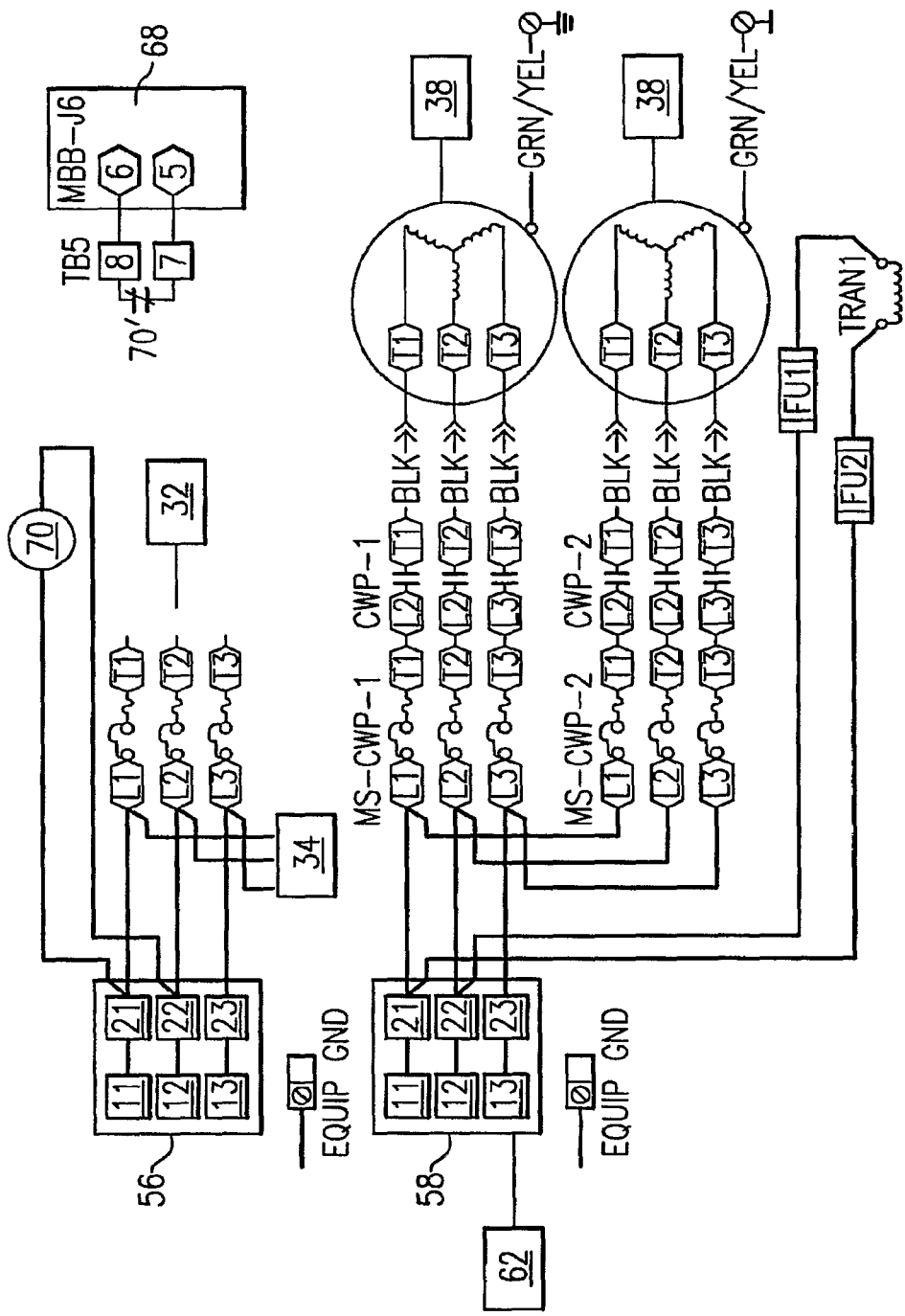
FIG. 2 illustrates a circuit diagram of a power system of the heating/cooling system.

FIG. 2 illustrates a circuit diagram of the power system of the heating/cooling system 10. In the event of a power failure, the main power supply 56 stops supplying power to the fluid moving device 34 and the motor 32 of the compressor 22, and the refrigerant in the refrigerant circuit 30 stops circulating as no power is supplied to the motor 32. The current sensing relay 70 of the control circuit 68 detects the loss in power and closes a normally closed contact 70' to indicate there is a power failure. When this occurs, the main control 42 initiates the boiler control algorithm.

During a power failure, the boiler control algorithm initiates a power algorithm that instructs a backup power supply 62 to provide power to operate the water pump 38 of the water circuit 36. In one example, the backup power supply 62 is a battery pack associated with the uninterruptible power supply 58. The boiler control algorithm also initiates a fluid pump control algorithm that instructs the water pump 38 of the water circuit 36 to continue operating. The water pump 38 is therefore continuously supplied with an uninterruptible source of power. This is possible because the uninterruptible power supply 58 is separate from the main power supply 56. Therefore, water continues to flow through the water circuit 36, preventing the water in the water circuit 36 from freezing.

Generally, when the motor 32 of the compressor 22 fails, a compressor failure alarm is generated that signals that maintenance is required. When a power failure occurs, the boiler control algorithm "tricks" the motor 32 by indicating that the heating/cooling system 10 is operating in the heating mode. During the heating mode, it is expected that the motor 32 of the compressor 22 is not operational. Therefore, a compressor failure alarm is not generated during the power failure because it is expected that the compressor 22 be inactive.

In another example, the uninterruptible power supply 58 includes a back up generator 62. When a power failure occurs, both the refrigerant circuit 30 and the water circuit 36 are momentarily not provided with any power. The generator 62 provides power to the control circuit 42 and the water pump 38. The current sensing relay 70 will have detected the interruption in power, and the main control 42 generates the boiler control algorithm as described above.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A system comprising:
a fluid pump that pumps a fluid through a fluid circuit;
a fluid power supply that powers the fluid pump;
a sensor to detect a power supply;
a control that generates a signal when the sensor detects an interruption in the power supply;
a backup power supply that powers the fluid pump when the control generates the signal; and
wherein the signal is a boiler control algorithm that indicates that the system is operating in a heating mode.

2. The system as recited in claim 1 further including:
a compressor to compress a refrigerant to a high pressure;
a heat rejecting heat exchanger for cooling the refrigerant;
an expansion device for reducing the refrigerant to a low pressure,
a heat accepting heat exchanger for heating the refrigerant, wherein the fluid exchanges heat with the refrigerant in the heat accepting heat exchanger to cool the fluid, and
a main power supply to power a motor of the compressor.

3. The system as recited in claim 1 wherein the backup power supply is a battery.

4. The system as recited in claim 1 wherein the backup power supply is a generator.

5. The system as recited in claim 1 wherein the fluid is water.

6. The system as recited in claim 1 wherein the sensor is a current sensor.

7. The system as recited in claim 1 wherein the control includes a refrigerant control circuit that controls a refrigeration system and a fluid control circuit that controls the fluid circuit.

8. The system as recited in claim 7 wherein the fluid control circuit controls the fluid pump.

9. The system as recited in claim 7 wherein components of the refrigeration system are powered by a main power supply that is separate from the fluid power supply.

10. The system as recited in claim 1 wherein the backup power supply powers the fluid pump to continue circulating the fluid through the fluid circuit when the sensor detects the interruption in the power supply.

11. The system comprising:
a fluid pump that pumps a fluid through a fluid circuit;
a fluid power supply that powers the fluid pump;
a sensor to detect a power supply;
a control that generates a signal when the sensor detects an interruption in the power supply:
a backup power supply that powers the fluid pump when the control generates the signal;
a compressor to compress a refrigerant to a high pressure;
a heat rejecting heat exchanger for cooling the refrigerant:
an expansion device for reducing the refrigerant to a low pressure.
a heat accepting heat exchanger for heating the refrigerant, wherein the fluid exchanges heat with the refrigerant in the heat accepting heat exchanger to cool the fluid, and
a main power supply to power a motor of the compressor; and
further including a boiler having a boiler heat exchanger, wherein the fluid of the fluid circuit exchanges heat with the refrigerant in the heat accepting heat exchanger to cool the fluid during a cooling mode of operation and the water of the fluid circuit exchanges heat with a fluid medium in the boiler heat exchanger of the boiler to heat the fluid during a heating mode of operation.

12. The system as recited in claim 11 further including a boiler pump that pumps the fluid medium through the boiler heat exchanger of the boiler, wherein the motor of the compressor is activated and the boiler pump is deactivated during the cooling mode of operation and the motor of the compressor is deactivated and the boiler pump is activated during the heating mode of operation.

13. The system as recited in claim 11 wherein the signal is a boiler control algorithm that indicates that the system is operating in a heating mode.

14. A method of powering a fluid pump of a fluid circuit, the method comprising the steps of:
pumping a fluid through the fluid circuit with the fluid pump;
sensing an interruption in a power supply;
generating a signal when the interruption in the power supply is detected;
utilizing a backup power supply to power the fluid pump to pump the fluid through the fluid circuit when the interruption in the power supply to the fluid pump is detected; and
wherein the step of generating a signal generates a boiler control signal to power the fluid pump with the backup power supply when the step of sensing detects the interruption in the power supply.

15. The method as recited in claim 14 further including the steps of cooling the fluid and using the fluid in a cooling application.

16. The method as recited in claim 14 further including the steps of heating the fluid and heating a space with the fluid.

17. The method as recited in claim 14 wherein the step of generating the signal indicates the system is operating in a heating mode.

* * * * *